US012663976B2

(12) United States Patent
Yamaguchi et al.

(10) Patent No.: US 12,663,976 B2
(45) Date of Patent: Jun. 23, 2026

(54) CONTROL SYSTEM, MOBILE OBJECT, CONTROL METHOD AND COMPUTER-READABLE STORAGE MEDIUM

(71) Applicant: HONDA MOTOR CO., LTD., Minato-ku (JP)

(72) Inventors: Kohei Yamaguchi, Tokyo (JP); Tomoaki Taki, Tokyo (JP); Genta Inoue, Tokyo (JP); Toshimi Hamada, Tokyo (JP); Yosuke Shionoya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 777 days.

(21) Appl. No.: 17/456,576

(22) Filed: Nov. 25, 2021

(65) Prior Publication Data

US 2022/0197627 A1 Jun. 23, 2022

(30) Foreign Application Priority Data

Dec. 22, 2020 (JP) ................................. 2020-213020

(51) Int. Cl.
G06F 8/65 (2018.01)
B60W 40/10 (2012.01)

(52) U.S. Cl.
CPC .............. *G06F 8/65* (2013.01); *B60W 40/10* (2013.01); *B60W 2556/45* (2020.02)

(58) Field of Classification Search
CPC ....................................................... G06F 8/65
See application file for complete search history.

(56) References Cited

U.S. PATENT DOCUMENTS

2013/0305262 A1* 11/2013 Nara ..................... G06F 9/4484
715/810
2015/0301822 A1 10/2015 Takahashi
(Continued)

FOREIGN PATENT DOCUMENTS

CN 104823165 A 8/2015
CN 111247038 A 6/2020
(Continued)

OTHER PUBLICATIONS

Office Action issued for counterpart Japanese Application No. 2020-213020, issued by the Japanese Patent Office on Sep. 27, 2022 (drafted on Sep. 22, 2022).
(Continued)

*Primary Examiner* — Jae U Jeon

(57) ABSTRACT

Provided is a control system, including: a mobile object control unit configured to control a mobile object; an update control unit configured to receive an update program of the mobile object control unit from an external apparatus, and update the mobile object control unit with the update program; an instruction acquisition control unit configured to perform control to acquire a user instruction indicating that the update of the mobile object control unit with the update program is not executed; and a determination unit configured to determine whether an updatable condition is satisfied, which is a determination condition for determining the mobile object is in an updatable state or not, based on at least either of a driveline state of the mobile object or an opening or closing state of a door installed in the mobile object.

20 Claims, 6 Drawing Sheets

(56)                  References Cited

U.S. PATENT DOCUMENTS

| | | | |
|---|---|---|---|
| 2016/0082975 A1* | 3/2016 | Lovett ................... | B60W 10/30 |
| | | | 701/2 |
| 2018/0150290 A1 | 5/2018 | Matsuda | |
| 2019/0250902 A1 | 8/2019 | Tateishi | |
| 2020/0114927 A1 | 4/2020 | Yokota | |
| 2021/0173628 A1 | 6/2021 | Aiba | |
| 2021/0191661 A1 | 6/2021 | Harata | |
| 2022/0361127 A1* | 11/2022 | Chen ...................... | H04L 67/12 |

FOREIGN PATENT DOCUMENTS

| | | | |
|---|---|---|---|
| JP | 2006163573 A | 6/2006 | |
| JP | 2013084143 A | 5/2013 | |
| JP | 2016218932 A | 12/2016 | |
| JP | 2018037022 A | 3/2018 | |
| JP | 2018097571 A | 6/2018 | |
| JP | 2020027666 A | 2/2020 | |
| JP | 2020062909 A | 4/2020 | |

OTHER PUBLICATIONS

Office Action issued for counterpart Chinese Application 202111400731. 1, issued by The State Intellectual Property Office of People's Republic of China on Feb. 19, 2025.

\* cited by examiner

10

70

EXTERNAL APPARATUS

90

200

CONTROL SYSTEM

CONTROL SYSTEM, MOBILE OBJECT, CONTROL METHOD AND COMPUTER-READABLE STORAGE MEDIUM

The contents of the following Japanese patent application are incorporated herein by reference:

Japanese Patent Application NO. 2020-213020 filed on Dec. 22, 2020.

BACKGROUND

1. TECHNICAL FIELD

The present invention relates to a control system, a mobile object, a control method and a computer-readable storage medium.

2. RELATED ART

Patent Document 1 discloses an ECU as an ECU for a vehicle in which the application program can be rewritten.

PRIOR ART DOCUMENT

Patent Document

Patent Document 1: Japanese Patent Application Publication No. 2020-27666

BRIEF DESCRIPTION OF THE DRAWINGS

FIG. 1 schematically illustrates an update system 10 according to one embodiment.

DESCRIPTION OF EXEMPLARY EMBODIMENTS

Figure 2:
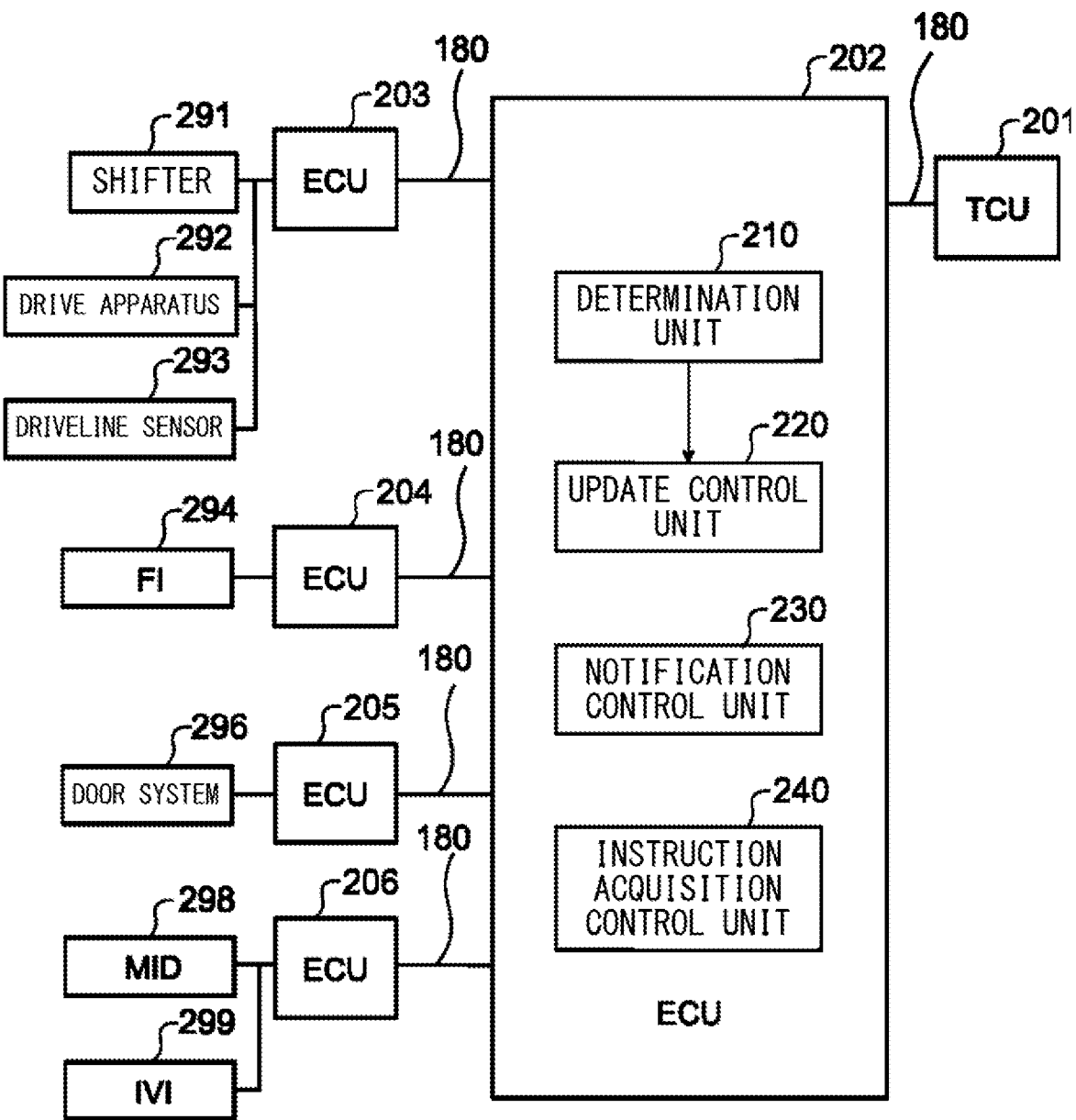
FIG. 2 schematically illustrates a system configuration included in a control system 200.

Hereinafter, the present invention will be described through embodiments of the invention. However, the following embodiments do not limit the claimed invention. In addition, not all combinations of features described in the embodiments are essential to the solution of the invention.

Figure 1:
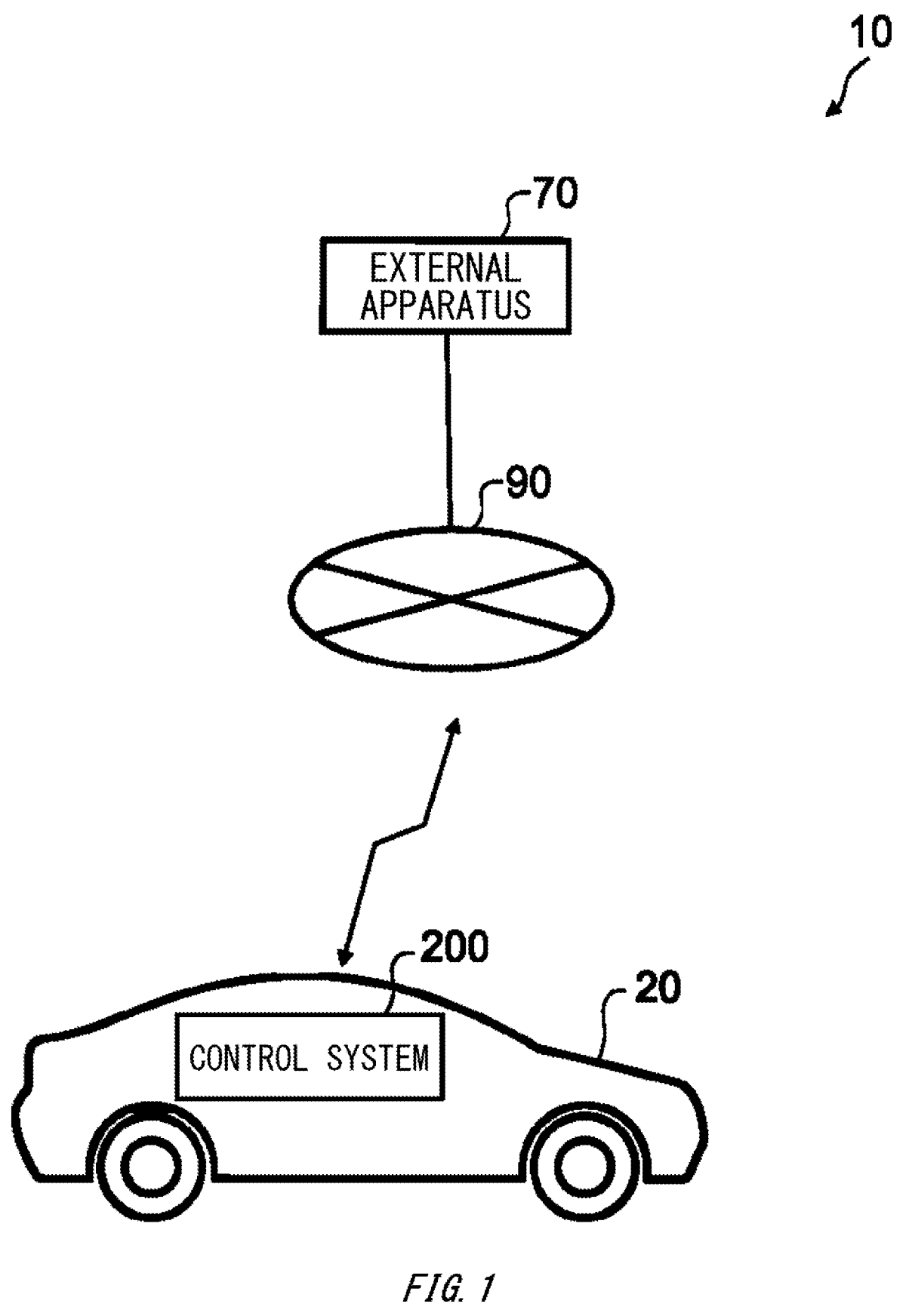

FIG. 1 schematically illustrates an update system 10 according to one embodiment. The update system 10 includes a vehicle 20 and an external apparatus 70. The vehicle 20 includes a control system 200. The control system 200 is responsible for the control of the vehicle 20 and the communication with the external apparatus 70 through the communication network 90. The communication network 90 includes an IP network such as the Internet, a P2P network, a dedicated line including VPN, a virtual network, a mobile communication network and so on.

In the vehicle 20, the control system 200 includes a plurality of ECUs (Electronic Control Units) performing control on the vehicle 20. The control system 200 acquires an update program of the ECU included in the control system 200 from the outside. For example, the control system 200 receives the update program transmitted from an external apparatus 70 through the communication network 90 by wireless communication. The control system 200 performs reprogramming the ECU included in the control system 200 according to the update program. The reprogramming is performed for the purpose of upgrading the function of the ECU included in the control system 200 or the like. In this way, the control system 200 updates the ECU by reprogramming the ECU by OTA (Over The Air).

The control system 200 notifies the user of the vehicle 20, for example, when the IG (ignition) power of the vehicle 20 is turned off, that a system update will be performed by the update program. The control system 200 starts the update if it does not obtain an update postponement instruction from the user before a predetermined time elapses. At this time, the control system 200 automatically starts the update, on the condition that the vehicle speed of the vehicle 20 is 0, the IG power is in the off state, the shift position is in the parking position, and the bonnet hood is in the closed state. When the control system 200 finishes updating the ECU, it turns the power state of the vehicle 20 to the off state.

According to the control of the control system 200, the ECU updates can be prevented from being started while the user is using the vehicle 20. In addition, since updates are automatically performed in the absence of update postponement instructions from the user, it is possible to prevent the ECU from being left unupdated when, for example, an important update program exists.

Since the user can not use the vehicle 20 while the ECU is being updated, once the ECU update starts, there will be downtime until the ECU update is completed. According to the control of the control system 200, since the control system 200 accepts update postponement instructions from the user until a predetermined time elapses after the IG power is turned off, the ECU update can be prevented from being started if the user wants to use the vehicle 20 immediately after the IG power is turned off. This can prevent unintended downtime from occurring for the user. In addition, since the control system 200 accepts the update postponement instruction for a predetermined time after the IG power is turned off, and turns the power state to an off state when the update is completed, the power of the battery included in the vehicle 20 can be avoided from being consumed unnecessarily.

FIG. 2 schematically illustrates a system configuration included in the control system 200. The control system 200 includes a TCU 201, an ECU 202, an ECU 203, an ECU 204, an ECU 205 and an ECU 206.

The TCU 201, the ECU 203, the ECU 204, the ECU 205 and the ECU 206 are connected to the ECU 202 through an in-vehicle communication line 180. The TCU 201, the ECU 203, the ECU 204, the ECU 205 and the ECU 206 mutually communicate through the in-vehicle communication line 180 and the ECU 202. The ECU 202 supervises and controls the TCU 201, the ECU 203, the ECU 204, the ECU 205 and the ECU 206. The in-vehicle communication line 180 may be configured to include, for example, the CAN (Controller Area Network) or the Ether Network or the like.

The TCU 201 is a telematics control unit (Telematics Control Unit). The TCU 201 is at least responsible for the communication through the communication network 90. The TCU 201 is one example of the communication unit.

The ECU 203, the ECU 204, the ECU 205 and the ECU 206 are respectively a vehicle control unit for controlling the vehicle 20. The ECU 203, the ECU 204, the ECU 205 and the ECU 206 controls various devices included in the vehicle 20. For example, the ECU 203 controls a shifter 291, the drive apparatus 292 and the driveline sensor 293. The shifter 291 is a transmission system device equipped with a gearbox. The drive apparatus 292 is a power unit including, for example, an internal combustion engine and a motor and so on. The driveline sensor 293 includes a vehicle speed sensor for detecting the moving speed of the vehicle 20. The shifter 291, the drive apparatus 292 and the driveline sensor 293 are devices belonging to the driveline of the vehicle 20. The ECU 204 controls the FI 294 that is a fuel injection apparatus. The ECU 205 controls a door system 296. The door system 296 includes the bonnet hood, fuel lid, and other opening and closing doors for maintenance. The ECU 206 controls the MID 298 and the IVI 299. The MID 298 is a multi-information display (MID). The IVI 299 is, for example, an in-vehicle infotainment information device (IVI).

In the present embodiment, a system configuration of the control system 200, including the TCU 201, the ECU 202, the ECU 203, the ECU 204, the ECU 205 and the ECU 206, is shown as an example, but the system configuration of the control system 200 is not limited to the example of the present embodiment. Also, in the present embodiment, the ECU that is the update target of the update program is the ECU 204 as an example However, the ECU that is the update target of the update program is not limited to the ECU 204.

The update control unit 220 receives the update program of the ECU 204 from the external apparatus 70, and updates the ECU 204 with the update program. The update control unit 220 receives the update program from the external apparatus 70 through the TCU 201.

The determination unit 210 determines whether the updatable condition is satisfied, which is the determination condition for determining whether the vehicle 20 is in an updatable state or not, based on at least either of the driveline state of the vehicle 20 or the opening or closing state of the door installed in the vehicle 20. The driveline is, for example, the shifter 291 or the drive apparatus 292 or the like.

The notification control unit 230 controls the notification related to the update of the ECU 204 toward the user. The user may be, for example, the passenger of the vehicle 20. The notification control unit 230 displays the update notification information on the MID 298 and the IVI 299 through the ECU 206. The notification control unit 230 may cause a notification to be executed to the user on the condition that the updatable condition is satisfied.

The instruction acquisition control unit 240 controls the acquisition of a user instruction to not execute the update of the ECU 204 by the update program. For example, the instruction acquisition control unit 240 controls the acquisition of a user instruction that is input to the IVI 299 through the ECU 206.

The update control unit 220 updates the ECU 204 with the update program on the condition that the updatable condition is satisfied if no user instructions are obtained. For example, the update control unit 220 updates the ECU 204 with the update program if no user instructions are obtained before a predetermined time elapses after the notification to the user regarding the update of the ECU 204 is executed. The predetermined time may be, for example, from 30 seconds to 600 seconds. The predetermined time is preferably within 300 seconds. The predetermined time is desired to be within 180 seconds. The shorter this time is, the power consumption amount until the user instruction is acquired can be less, thus suppressing battery degradation. On the other hand, if this time is too short, it may not be possible to properly obtain the user's intentions when the user does not want to perform the update.

The update control unit 220 does not update the ECU 204 with the update program if the updatable condition is no longer satisfied before the predetermined time elapses. This can prevent updates from being started in response to the increased possibility that the vehicle 20 will be used.

The notification to the user may include a notification to allow the user to choose whether or not to perform the update of the ECU 204. The update control unit 220 may update the ECU 204 with the update program before a predetermined time elapses when a user instruction to perform the update of the ECU 204 is obtained by the instruction acquisition control unit 240. This allows the update to be started when there is an instruction from the user to execute the update, thus reducing the power consumption amount during user notification.

In the updatable condition, the state of the driveline may be at least one of the moving speed of the vehicle 20, the state of the drive apparatus of the vehicle 20, and the state of the gearbox included in the vehicle 20. For example, the updatable conditions may include that the moving speed is zero, the drive apparatus 292 is at a standstill, the shift lever operating the gearbox is in a position that fixes the gear included in the gearbox, and the door is in a closed state. Note that the "position in which the gear included in the gearbox is fixed" is, for example, the parking position. The door may be an opening and closing cover for maintenance provided by the vehicle 20. The door may be, for example, a bonnet hood. The door may include at least one of the bonnet hood and the lid of the fuel supply port (fuel lid). Note that the vehicle speed and driveline status of the vehicle 20 are obtained from the ECU 203, and the opening or closing state of the door is obtained from the ECU 205.

Figure 3:
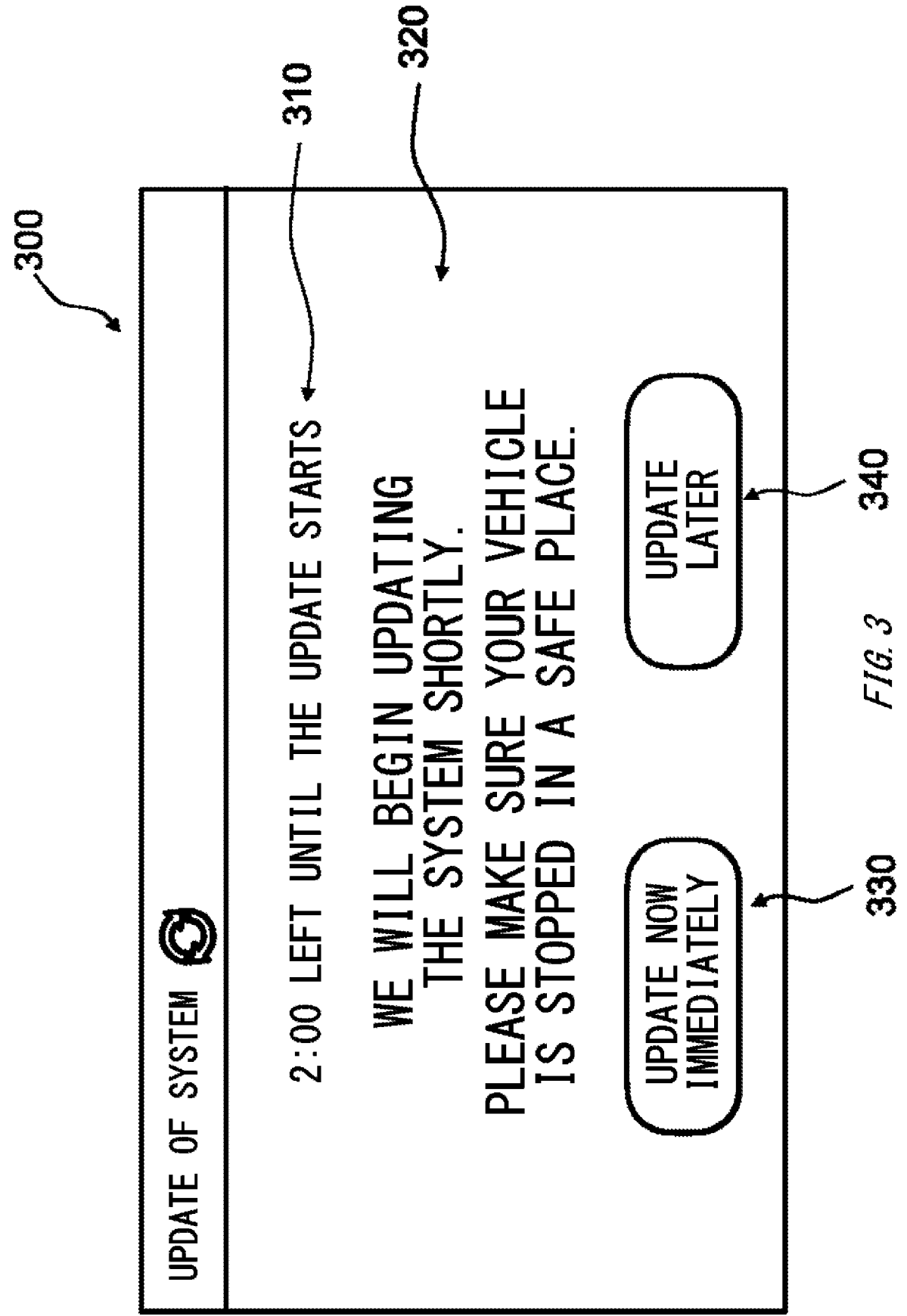
FIG. 3 illustrates one example of update notification information 300 displayed by IVI 299.

FIG. 3 illustrates one example of the update notification information 300 displayed on the IVI 299. The notification control unit 230 displays the update notification information 300 on the IVI 299 when the IG power of the vehicle 20 is turned off after the update program of the ECU 204 is downloaded from the external apparatus 70.

The update notification information 300 includes wait time information 310, which is the time until the update of the ECU 204 is started, message information 320 to the user, UI button 330 to obtain the update execution instruction to execute the update from the user, and UI button 340 to obtain the update postponement instruction to not execute the update from the user.

The wait time information 310 includes information indicating the remaining time until the update control unit 220 automatically starts updating the ECU 204. The notification control unit 230 counts down the remaining time in the wait time information 310 as time passes. The message information 320 is information used to notify the user that the system update should be started and that the vehicle 20 should be stopped at a safe location.

The instruction acquisition control unit 240 acquires the fact that the position of the UI button 330 is operated, as an update execution instruction from the user. The instruction acquisition control unit 240 acquires the operation of the display position of the UI button 340 as a postponement instruction from the user.

Figure 4:
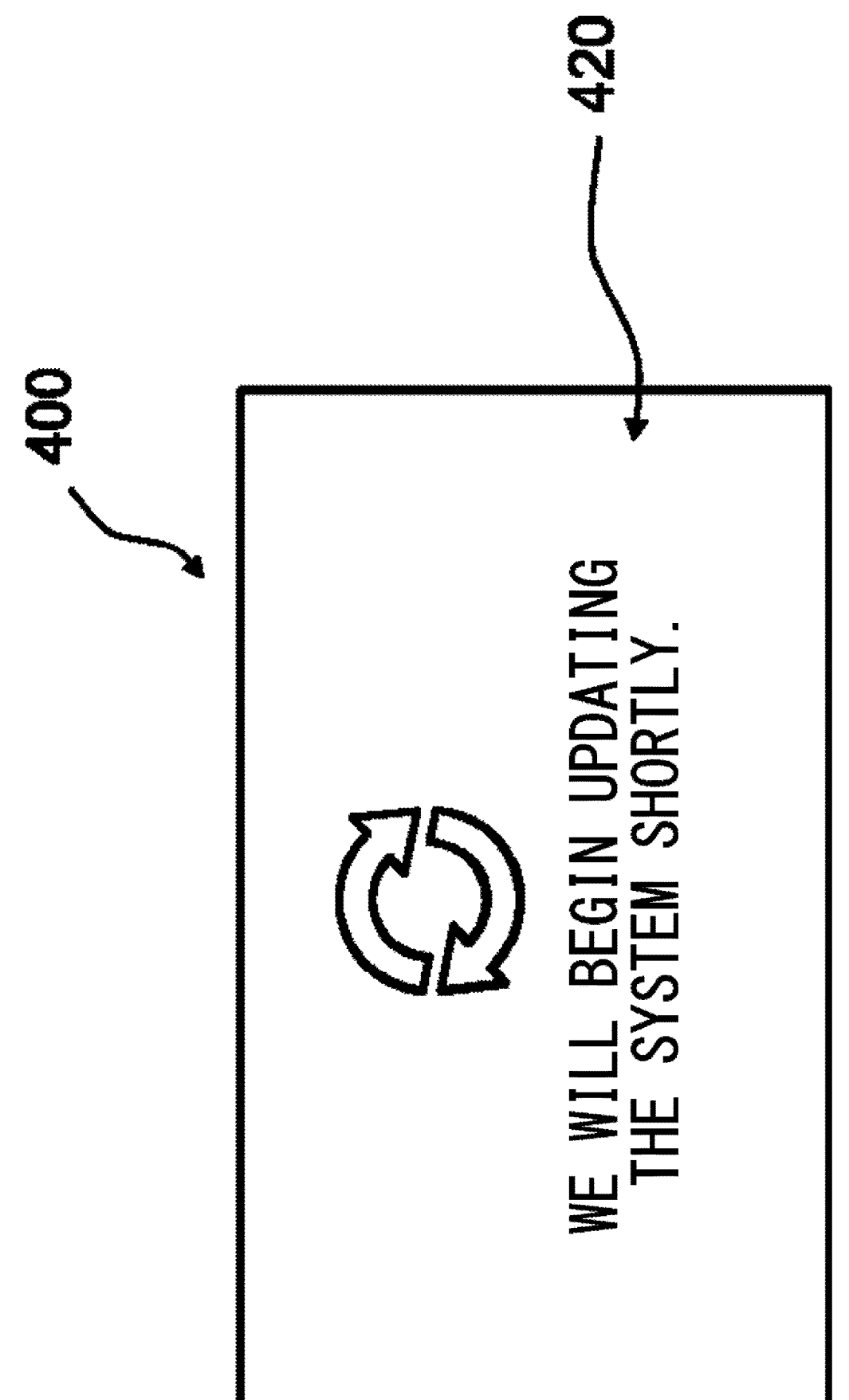
FIG. 4 illustrates one example of update notification information 400 displayed by MID 298.

FIG. 4 illustrates one example of the update notification information 400 displayed on the MID 298. The notification control unit 230 displays the update notification information 400 on the MID 298 when the IG power of the vehicle 20 is turned off after the update program of the ECU 204 is downloaded from the external apparatus 70. The update notification information 400 includes message information 420 to the user. The message information 420 is information used to notify the user that the system starts to be updated.

The notification control unit 230 notifies the user through the MID 298 in addition to the IVI 299. This can ensure that the user is aware that an update is started. For example, even if the IVI 299 broke down, the user can be notified through the MID 298.

Figure 5:
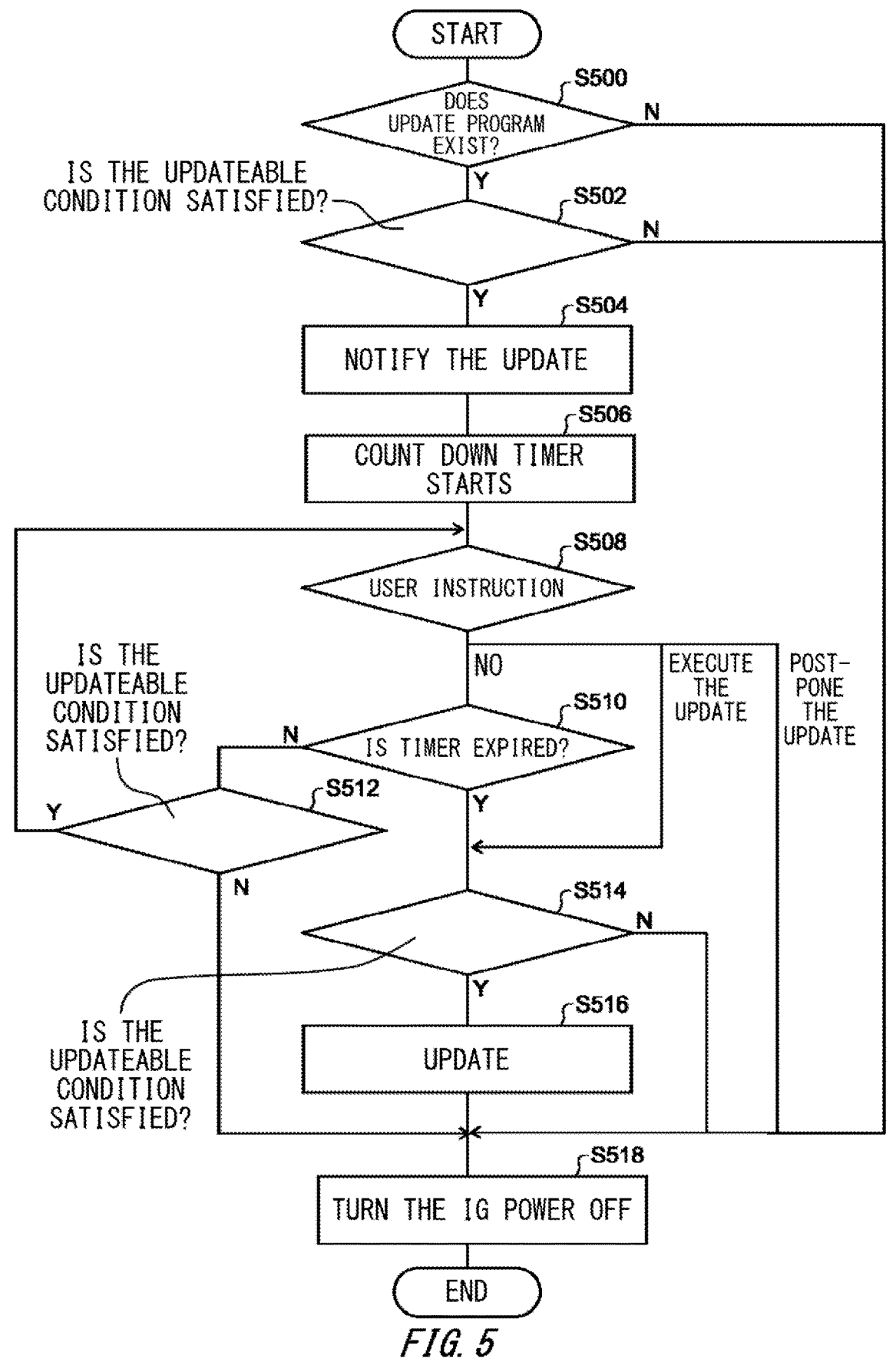
FIG. 5 illustrates a flowchart showing one example of a processing procedure related to an update process of ECU 204.

FIG. 5 illustrates a flowchart showing one example of a processing procedure related to the update process of the ECU 204. The processing of the flowchart in FIG. 5 is started when the IG power has been turned off.

In S500, the update control unit 220 determines whether the update program of the ECU 204 exists or not. For example, the update control unit 220 determines whether the update program is downloaded from the external apparatus 70 or not. Note that the update program may be stored by the ECU 202, or may be stored in a predetermined memory area for user data of the ECU 204 to be updated. If the update program does not exist, in S518, the IG power state is turned to the off state and the process of this flowchart is to be ended. If the update program does not exist, the processing to S502 is recommended.

In S502, the update control unit 220 determines whether the updatable condition is satisfied. In the present embodiment, the updateable conditions include the four conditions of (i) the vehicle speed detected by the driveline sensor 293 is zero, (ii) the shift position is in the parking position, (iii) the IG power is in the off state, and (iv) the bonnet hood and the fuel lid are in a closed state. The condition (i) allows to determine that the user has the intention to stop the vehicle 20.

The condition (ii) allows to determine that the user has the intention to park the vehicle 20. The condition (iii) allows to determine that the user has the intention to use the vehicle 20. The condition (iv) allows to determine that the user does not have the intention to maintain the vehicle 20. Note that if the state of the fuel lid can not be detected in the vehicle 20, the condition (iv) may be that the bonnet hood is in the closed state.

In S502, when the updatable condition is determined to be not satisfied, the process is shifted to S518. If it is determined that the updatable condition is satisfied in S502, in S504, the notification control unit 230 causes the notification regarding the update of the ECU 204 to be executed. The notification control unit 230 displays the update notification information 300 on the IVI 299 and the update notification information 400 on the MID 298, as described in relation to FIG. 3 and FIG. 4. The notification control unit 230 may output sound effects from the MID 298 when displaying the update notification information 300 and the update notification information 400. In addition, the notification control unit 230 may, for example, output the wording of the message information 320 described in relation to FIG. 3 by sound. In this way, the notification control unit 230 may notify the user of the update by display and voice. The notification control unit 230 provides sound and display from each of the MID 298 and the IVI 299, so even if one of the MID 298 and the IVI 299 is failing, the user can be made aware of the update.

Then, for S506, the update control unit 220 starts the countdown timer. As an example, the countdown timer is a timer that expires in 120 seconds. In S508, the instruction acquisition control unit 240 determines the user instruction. For example, the instruction acquisition control unit 240 determines that there are no user instruction when no user operation information for the IVI 299 has been acquired from the IVI 299. When the instruction acquisition control unit 240 obtains user operation information from the IVI 299 indicating that the position of the UI button 330 in FIG. 3 has been operated, it determines that the user instruction is an update execution instruction.

When the instruction acquisition control unit 240 obtains user operation information from the IVI 299 indicating that the position of the UI button 340 in FIG. 3 has been operated, it determines that the user instruction is an update postponement instruction.

In S508, if the user instruction is determined to be an update postponement instruction, the process is shifted to S518. In S508, if the user instruction is determined to be an update execution instruction, the process is shifted to S514. In S508, if it is determined that there was no user instruction, the process is shifted to S510.

In S510, whether the countdown timer has expired is determined. If the countdown timer is expired, the process is shifted to S514. If the countdown timer is not expired, the process is shifted to S512. In S512, the update control unit 220 determines whether the updatable condition is satisfied. The determination in S512 is identical to the determination in S502. If the updatable condition is satisfied, the process is shifted to S508. If the updatable condition is not satisfied, the process is shifted to S518.

As explained in relation to S510 and S508, S514 is processed when the countdown timer expires or when the update execution instruction is obtained from the user. In S514, the update control unit 220 determines whether the updatable condition is satisfied. The determination in S514 is identical to the determination in S502. If the updatable condition is satisfied, the process is shifted to S516. If the updatable condition is not satisfied, the process is shifted to S518.

In S516, the update control unit 220 executes the update of the ECU 204 with the update program. When the update of the ECU 204 completes, the process is shifted to S518.

The update process of the ECU 204 in S516 is to be described. First, the update process when the internal memory of the ECU 204 is a single bank memory (so-called one-sided ROM) is to be described. In this case, since the ECU 204 has only one memory area for control to store the control program, the update program can not be written to the memory area for control when the ECU 204 is operating according to the control program. Therefore, the update control unit 220 writes the update program to the memory area for control of the ECU 204 in S516. When the update control unit 220 completes writing the update program, it activates the update program as necessary. Activation of the update program includes the process of setting the startup parameters of the ECU 204 so that, for example, when the ECU 204 starts up, the ECU 204 loads the update program stored in the memory area for control and starts control based on the update program.

Next, the update process when the internal memory of the ECU 204 is a double-bank memory (so-called two-sided ROM) is to be described. In this case, since the ECU 204 has two memory areas for control for storing control programs, an update program can be written in the second memory area for control when the ECU 204 is operating according to the control program stored in the first memory area for control. Therefore, when the update control unit 220 completes the download of the update program, it can send the update program to the ECU 204 and write the update program in the second memory area for control, for example, even when the vehicle 20 is running In S516, if the update program has already been written to the second memory area for control, the update control unit 220 updates the ECU 204 by activating the update program stored in the second memory area for control. Activation of the update program includes the process of setting the startup parameters of the ECU 204 so that, for example, when the ECU 204 starts up, the ECU 204 loads the update program stored in the second memory area for control and starts control based on the update program. Note that if the update program has not been written to the second memory area for control in S516, the update control unit 220 writes the update program to the second memory area for control of the ECU 204, and when the writing of the update program is completed, the update control unit 220 updates the ECU 204 by activating the update program stored in the second memory area for control. Thus, "updating the ECU with the update program" is a concept that includes writing the update program to the memory area for control of the ECU. Updating the ECU with the update program" is a concept that includes activating the update program.

As explained in relation to FIG. 5 and others, the determination unit 210 performs the determination of whether the updateable conditions are satisfied or not at three points in time: before notifying the user, during the period of notifying the user, and before executing the update. This makes it possible to determine in a timely manner whether or not the user has the intention of not performing the update. In addition, it is possible to suppress the occurrence of the downtime of the vehicle 20 to update the ECU simply by stopping at a traffic light or a railroad crossing. It also can prevent the user from being notified of an update simply because the vehicle 20 stops at a traffic light or a railroad crossing.

The above-mentioned embodiment can prevent ECU updates from being started when the user has the intention to use the vehicle 20. This can prevent unintended downtime from occurring for the user. It also can prevent the ECU from being left unupdated when important update programs exist. Since the update postponement instruction is accepted for a predetermined time after the user is notified of the update, the power of the battery provided by the vehicle 20 can be avoided from being consumed unnecessarily.

Figure 6:
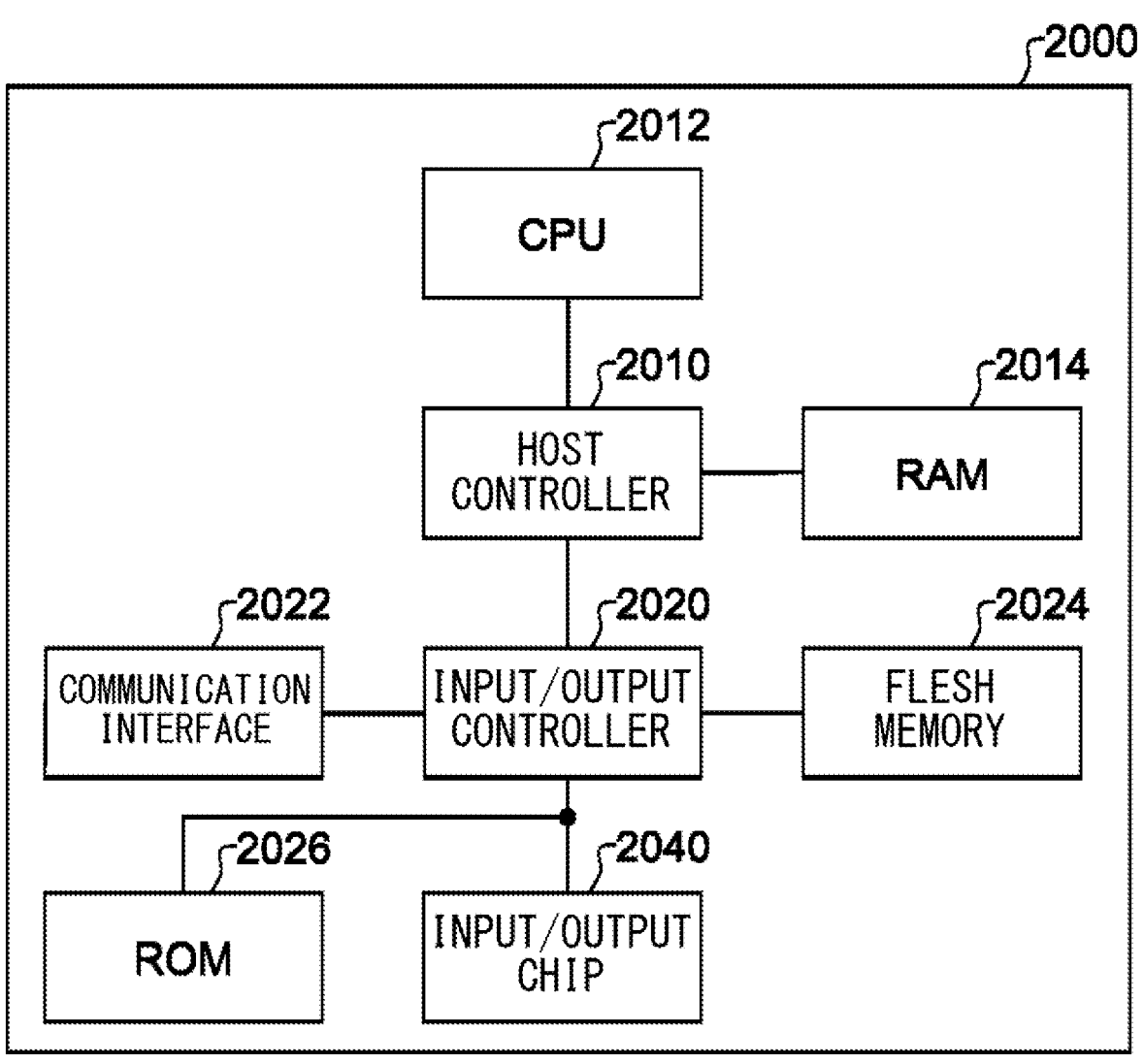
FIG. 6 illustrates an example of a computer 2000.

FIG. 6 illustrates an example of a computer 2000 in which a plurality of embodiments of the present invention can be entirely or partially embodied. The program installed on the computer 2000 can cause the computer 2000 to function as a system, such as a control system, or an apparatus or each unit of such an apparatus according to the embodiment, to perform operations associated with such an apparatus or each unit of such an apparatus, and/or to perform the process or a step of the process according to the embodiment. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input and output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources mentioned above. An apparatus or a method may be configured by realizing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and perform various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described in this specification and specified by instruction sequences of the programs, and write back a result into the RAM 2014. In addition, the CPU 2012 may search for information in a file, a database, or the like in the recording medium. For example, when a plurality of entries, each having an attribute value of a first attribute associated with an attribute value of a second attribute, is stored in the recording medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

The program or software module described above may be stored on the computer 2000 or in a computer-readable storage medium near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

The program that is installed in the computer 2000 and makes the computer 2000 function as the control system 200 may work on the CPU 2012 and so on to make the computer 2000 function as each unit of the control system 200 respectively. The information processing described in these programs, when read into a computer 2000, functions as each unit of the control system 200, which is a specific means of cooperation between software and the various hardware resources described above. Then, by realizing the calculation or processing of information according to the purpose of use of the computer 2000 in the present embodiment by these specific means, a control system 200 specific to the purpose of use is constructed.

Various embodiments have been described with reference to the block diagrams and the like. Blocks in the block diagrams may respectively represent (1) steps of processes in which operations are performed or (2) "units" of apparatuses responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

Computer-readable storage media may include any tangible device that can store instructions to be executed by a suitable device, and as a result, the computer-readable storage medium having the instructions stored thereon constitutes at least a part of an article of manufacture including instructions which can be executed to create means for performing operations specified in the processing procedures or block diagrams. Examples of the computer-readable storage medium may include an electronic storage medium, a magnetic storage medium, an optical storage medium, an electromagnetic storage medium, a semiconductor storage medium, or the like. Specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

The computer-readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general purpose computer, a special purpose computer, or other programmable data processing apparatus, or to programmable circuit, locally or via a local area network (LAN), wide area network (WAN) such as the Internet, and a computer-readable instruction may be executed to provide means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: update system; 20: vehicle; 70: external apparatus; 90: communication network; 180: in-vehicle communication line; 200: control system; 201: TCU; 202: ECU; 203: ECU; 204: ECU; 205: ECU; 206: ECU; 210: determination unit; 220: update control unit; 230: notification control unit; 240: instruction acquisition control unit; 291: shifter; 292: drive apparatus; 293: driveline sensor; 294: FL 296: door system; 298: MID; 299: IVI; 300: update notification information; 310: wait time information; 320: message information; 330: UI button; 340: UI button; 400: update notification information; 420: message information; 2000: computer; 2010: host controller; 2012: CPU; 2014: RAM; 2020: input/output controller; 2022: communication interface; 2024: flash memory; 2026: ROM; 2040: input/output chip

What is claimed is:

1. A control system, comprising:
   an Electronic Control Unit (ECU) configured to control a mobile object;
   at least one processor; and
   a communication interface configured to receive, wherein
   the communication interface is configured to receive an update program of the ECU from an external apparatus, and the at least one processor is configured to
update the ECU the update program;
perform control to acquire a user instruction indicating
that the update of the ECU with the update program is
not executed;
determine whether an updatable condition is satisfied,
which is a determination condition for determining
whether the mobile object is in an updatable state or
not, based on at least either of a driveline state of the
mobile object or an opening or closing state of a door
installed in the mobile object; and
    update the ECU with the update program on a condition
that the updatable condition is satisfied when the user
instruction has not been acquired.

2. The control system according to claim 1, wherein the
at least one processor is configured to update the ECU with
the update program when the user instruction has not been
acquired before a predetermined time elapses after a notification to a user regarding the update of the ECU has been
executed.

3. The control system according to claim 2, wherein the
predetermined time is from 30 seconds to 600 seconds.

4. The control system according to claim 3, wherein the
predetermined time is within 300 seconds.

5. The control system according to claim 3, wherein the
at least one processor is further configured to control a
notification to the user regarding the update of the ECU.

6. The control system according to claim 3, wherein the
at least one processor is configured not to update the ECU
with the update program when the updatable condition has
not been satisfied before the predetermined time elapses.

7. The control system according to claim 3, wherein
a notification to the user includes a notification for letting
a user to select whether to execute the update of the
ECU; and
the at least one processor is configured to update the ECU
with the update program before the predetermined time
elapses when a user instruction indicating to execute
the update of the ECU is acquired.

8. The control system according to claim 2, wherein the
at least one processor is further configured to control a
notification to the user regarding the update of the ECU.

9. The control system according to claim 8, wherein the
at least one processor is configured to executes a notification
to the user on a condition that the updatable condition is
satisfied.

10. The control system according to claim 2, wherein the
at least one processor is configured not to update the ECU
with the update program when the updatable condition has
not been satisfied before the predetermined time elapses.

11. The control system according to claim 2, wherein
a notification to the user includes a notification for letting
a user to select whether to execute the update of the
ECU; and
the at least one processor is configured to update the ECU
with the update program before the predetermined time
elapses when a user instruction indicating to execute
the update of the ECU is acquired.

12. The control system according to claim 2, wherein
the state of the driveline includes at least either of
a moving speed of the mobile object;
a state of a drive apparatus of the mobile object; and
a state of a gearbox included in the mobile object.

13. The control system according to claim 1, wherein
the state of the driveline includes at least either of
a moving speed of the mobile object;
a state of a drive apparatus of the mobile object; and
a state of a gearbox included in the mobile object.

14. The control system according to claim 13, wherein
the updatable condition includes that
the moving speed is 0;
the drive apparatus is at standstill;
a shift lever operating the gearbox is in a position that
fixes a gear included in the gearbox; and
the door is in a closed state.

15. The control system according to claim 13, wherein
the door includes an opening and closing cover for
maintenance included in the mobile object.

16. The control system according to claim 15, wherein
the mobile object is a vehicle;
the door includes at least one of a bonnet hood and a fuel
supply port lid; and
the drive apparatus is an engine or a power unit.

17. A mobile object comprising the control system
according to claim 1.

18. The mobile object according to claim 17, wherein the
mobile object is a vehicle.

19. A control method, comprising:
receiving, by a communication interface, an update program of a mobile object control unit configured to
control a mobile object, from an external apparatus;
performing control, by at least one processor, to acquire a
user instruction indicating that the update of the mobile
object control unit with the update program is not
executed; and
determining, by the at least one processor, whether an
updatable condition is satisfied, which is a determination condition for determining whether the mobile
object is in an updatable state or not, based on at least
either of a driveline state of the mobile object or an
opening or closing state of a door installed in the
mobile object; and
updating, by the at least one processor, the mobile object
control unit with the update program on a condition that
the updatable condition is satisfied when the user
instruction has not been acquired.

20. A computer readable storage medium, which is a
non-transitory computer-readable storage medium having
stored therein a program that, when executed by a computer
including at least one processor and a communication interface, causes the computer to
operate, by using the at least one processor, a mobile
object control unit configured to control a mobile
object;
receive, by using the communication interface, an update
program of the mobile object control unit from an
external apparatus, and update, by using the at least one
processor, the mobile object control unit with the
update program;
perform control, by using the at least one processor, to
acquire a user instruction indicating that the update of
the mobile object control unit with the update program
is not executed; and
determine, by using at least one processor, whether an
updatable condition is satisfied, which is a determination condition for determining whether the mobile
object is in an updatable state or not, based on at least
either of a driveline state of the mobile object or an
opening or closing state of a door installed in the
mobile object, and
update, by at least one processor, the mobile object
control unit with the update program on a condition that the updatable condition is satisfied when the user instruction has not been acquired.

* * * * *